US011155201B2

(12) United States Patent
Fletcher

(10) Patent No.: US 11,155,201 B2
(45) Date of Patent: Oct. 26, 2021

(54) APPARATUS FOR ANGULAR ADJUSTMENT OF LIGHTING UNIT COMPONENTS

(71) Applicant: BEE LIGHTING LIMITED, Redditch (GB)

(72) Inventor: Christian Fletcher, Redditch (GB)

(73) Assignee: BEE LIGHTING LIMITED, Redditch (GB)

(*) Notice: Subject to any disclaimer, the term of this patent is extended or adjusted under 35 U.S.C. 154(b) by 0 days.

(21) Appl. No.: 16/979,361

(22) PCT Filed: Mar. 11, 2019

(86) PCT No.: PCT/GB2019/050669
§ 371 (c)(1),
(2) Date: Sep. 9, 2020

(87) PCT Pub. No.: WO2019/171086
PCT Pub. Date: Sep. 12, 2019

(65) Prior Publication Data
US 2021/0001766 A1 Jan. 7, 2021

(30) Foreign Application Priority Data
Mar. 9, 2018 (GB) .................................. 1803809

(51) Int. Cl.
*B60Q 1/00* (2006.01)
*F21S 45/50* (2018.01)
(Continued)

(52) U.S. Cl.
CPC ......... *B60Q 1/0035* (2013.01); *B60Q 1/0683* (2013.01); *B60Q 1/2611* (2013.01);
(Continued)

(58) Field of Classification Search
CPC .. B60Q 1/0035; B60Q 1/0683; B60Q 1/2611; F21S 41/143; F21S 41/151; F21S 41/657; F21S 45/50
See application file for complete search history.

(56) References Cited

U.S. PATENT DOCUMENTS 1,428,689 A 9/1922 Greenberg
2,294,437 A 9/1942 Allen
(Continued)

FOREIGN PATENT DOCUMENTS

FR 2924070 A1 5/2009
JP S63-49703 U 4/1988

OTHER PUBLICATIONS

Search Report in Great Britain Application No. GB1803809.1, dated Sep. 6, 2018.
(Continued)

*Primary Examiner* — Rajarshi Chakraborty
*Assistant Examiner* — Nathaniel J Lee
(74) *Attorney, Agent, or Firm* — Cognition IP, P.C.; Edward Steakley

(57) ABSTRACT

An apparatus for adjusting a lighting feature, comprising: a lighting feature, configured to rotate around a first axis of rotation, and comprising a first contact surface; and a rotatable means, configured to rotate around a second different axis of rotation, and comprising a second contact surface angled at a substantially non-perpendicular angle with respect to said second axis of rotation; wherein: the apparatus is configured such that said first contact surface contacts said second contact surface and rotation of said rotatable means around said second axis of rotation effects interaction of said second contact surface with said first contact surface thereby adjusting the angular displacement of said lighting feature around said first axis of rotation.

26 Claims, 11 Drawing Sheets

(51) Int. Cl.
*F21S 41/143* (2018.01)
*F21S 41/657* (2018.01)
*F21S 41/151* (2018.01)
*B60Q 1/068* (2006.01)
*B60Q 1/26* (2006.01)

(52) U.S. Cl.
CPC ........... *F21S 41/143* (2018.01); *F21S 41/151* (2018.01); *F21S 41/657* (2018.01); *F21S 45/50* (2018.01)

(56) References Cited

U.S. PATENT DOCUMENTS

| | | | | |
|---|---|---|---|---|
| 2,332,383 A * | 10/1943 | Kost | .................. | B64F 1/20 340/950 |
| 3,686,497 A | 8/1972 | Salvo et al. | | |
| 3,763,710 A * | 10/1973 | Kouth | .................. | B60Q 1/2611 74/10.2 |
| 4,965,706 A * | 10/1990 | Reiland | ................ | B60Q 1/0683 362/273 |
| 5,951,157 A | 9/1999 | Katutada et al. | | |
| 10,066,801 B1 * | 9/2018 | Rice | ...................... | F21S 41/194 |
| 2002/0036908 A1 | 3/2002 | Pederson | | |
| 2004/0012360 A1 | 1/2004 | Tuen | | |
| 2008/0136661 A1 * | 6/2008 | Pederson | ............. | B60Q 1/2611 340/815.45 |

OTHER PUBLICATIONS

International Search Report in International Application No. PCT/GB2019/050669, dated May 22, 2019.

\* cited by examiner

APPARATUS FOR ANGULAR ADJUSTMENT OF LIGHTING UNIT COMPONENTS

CROSS-REFERENCE TO RELATED APPLICATIONS

This application is a 35 U.S.C. § 371 national stage application of PCT International Application No. PCT/GB2019/050669, filed on Mar. 11, 2019, which claims the benefit of Great Britain Application No. 1803809.1, filed Mar. 9, 2018, which are hereby incorporated by reference in their entirety.

TECHNICAL FIELD

The present invention relates to adjuster systems for lighting units, in particular lighting units for vehicles, such as auxiliary roof light bars.

BACKGROUND

It is known to provide systems for controlled adjustment of vehicular lights. Such systems can involve apparatuses for adjusting the pitch of a lighting feature within a vehicular lighting system, for example a roof light bar, or take-down light. The level of adjustment in such systems may be relatively small, of the order of a few degrees and therefore the mechanisms are able to provide a fine level of adjustment.

Existing adjuster systems used within the automotive lamp industry tend to be operated by a combination of gear formed mechanisms that produce linear motion. Such adjuster systems often occupy relatively large amounts of space and have high complexity, which can limit their applicability (for example in smaller lighting units). For example, in an automotive vehicle the space in which an adjustment system may be constrained by the vehicle. As such some existing systems may not be suitable due to the size constraints imposed by the design of the vehicle in which the adjuster system is installed.

Accordingly, there is a need to provide adjuster systems, especially for automotive lamps, which can be used in size and space constrained environments, such as those found in vehicles.

SUMMARY

In order to mitigate some of the above problems, there is provided an adjustable lighting unit for a vehicle, comprising: a lighting feature (such as a reflector, light source optical component, etc.), configured to rotate around a first axis of rotation, and comprising a first contact surface; and a rotatable means (for example a face cam), configured to rotate around a second different axis of rotation, and comprising a second contact surface, wherein the second contact surface is at an oblique angle with respect to the second axis of rotation (e.g. the second contact surface and the second axis of rotation are not perpendicular). The lighting unit is configured such that the first contact surface contacts the second contact surface and rotation of the rotatable means around the second axis of rotation causes the second contact surface to displace the first contact surface thereby adjusting the angular displacement of the lighting feature around the first axis of rotation.

Advantageously, the invention provides an accurate and effective means for adjusting the angular position of a lighting feature, that is both simple to manufacture and install and less mechanically complex that existing arrangements. Moreover, the angular adjustment means of the present invention allows for continuous and cyclical adjustment of the lighting feature's angular position.

Preferably, the lighting unit comprises a locking feature (for example one or more projections) configured to abut the rotatable means in order to resist changes to the rotational position of the rotatable means and the lighting feature. In one example, the rotatable means comprises one or more corresponding elements (such as circumferential projections, grooves or depressions) configured to interact with the locking feature so as to resist changes to the rotational position of the rotatable means. Advantageously, this provides a simple and easily manufactured means for preventing changes in lighting feature angular position in the absence of a deliberate input to the rotatable means.

BRIEF DESCRIPTION OF THE DRAWINGS

Embodiments of the invention will now be described with reference to the accompanying drawings, in which.

DETAILED DESCRIPTION

Embodiments of the present invention will be now described with reference to the attached Figures. It is to be noted that the following description is merely used for enabling the skilled person to understand the present invention, without any intention to limit the applicability of the present invention to other embodiments which could be readily understood and/or envisaged by the reader. In particular, the present invention is described in relation to vehicular lighting systems, such as cars. However, it will be appreciated that the present invention could be applied in other areas such as other vehicles, as well as non-vehicular lighting systems.

Figure 1:
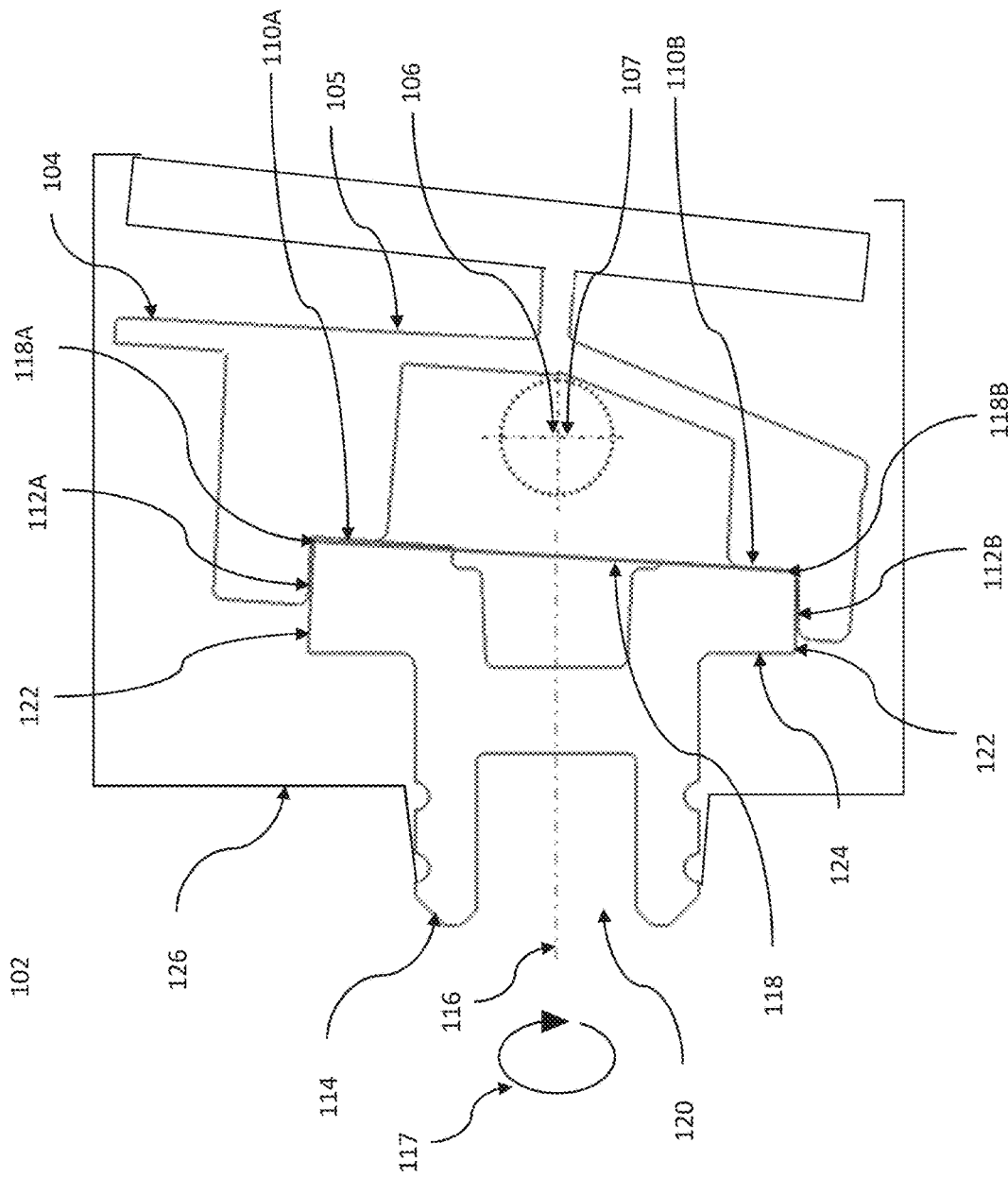
FIG. 1 shows a schematic of a portion of a cross section of an adjustable lighting unit according to a preferred embodiment.

FIG. 1 shows a schematic of a portion of a cross section of an adjustable lighting unit angular position of a lighting feature can be altered. In a preferred example, the adjustable lighting unit is an auxiliary roof light bar for use as a vehicular lighting unit. However, the skilled person would appreciate that the adjustable lighting unit could be any suitable lighting unit, for which it is desirable to be able to change the angular position of a lighting feature within the lighting unit (such as a vehicular headlamp, or a spotlight, etc.).

The lighting unit 102 of FIG. 1 comprises a lighting feature 104 that is able to rotate around a first axis of rotation 106 (in the case of FIG. 1, the first axis is orthogonal to the plane of the cross section). The lighting feature 104 can be any element of the lighting unit 102 that is desired to have an adjustable angular position, for example a reflector, a light source, etc.

Lighting feature 104 also includes an upper contact surface 110A and a lower contact surface 110B with respect to the first axis of rotation 106. In the preferred embodiment, contact surfaces 110A and 110B comprise planar surfaces and are positioned distal to the front portion 105 of lighting feature 104. Lighting feature 104 includes either a single contact surface or a plurality of contact surfaces (for example upper contact surface 110A and lower contact surface 110B are portions on the same continuous surface, or distinct elements). As described in further detail below, a force can be applied to contact surfaces 110A and/or 110B in order to rotate the lighting feature 104 around the axis of rotation 106. The lighting feature 104 has one or more pivot points 107 around which it rotates, thus defining the first axis of rotation 106.

Lighting unit 102 further includes a rotatable means 114 that is able to rotate around a second axis of rotation 116, for example in a first direction 117. The second axis of rotation 116 (about which rotatable means 114 rotates) is different from the first axis of rotation 106 (about which lighting feature 104 rotates). In the preferred embodiment, the second axis of rotation 116 of rotatable means 114 is substantially perpendicular to the first axis of rotation 106 of lighting feature 104, however the angle between the first axis of rotation 106 and the second axis of rotation 116 need not be 90 degrees.

Rotatable means 114 includes an angled surface 118 at a distal end. The angled surface 118 has an angle with respect to the second axis of rotation 116. The angled surface 118 of the rotatable means 114 is configured to be in contact with one or both of the upper contact surface 110A and lower contact surface 110B of lighting feature 104. In the preferred embodiment, at least a portion of angled surface 118 has an oblique angle with respect to the second axis 116. In other words, at least a portion of angled surface 118 is not perpendicular with respect to the second axis 116, i.e. the angled surface 118 has an angle at least one point on its surface that is not 90 degrees with respect to the second axis 116. Preferably, the angled surface 118 is a planar surface. In alternative examples, the angled surface 118 is non-planar, for example forming a convex or concave surface. As a result of having an angle relative to the second axis 116 other than 90 degrees, the angled surface 118 has a forward portion 118A that projects further in the direction of the second axis 116 than a rearward portion 118B.

Preferably the lighting unit 102 comprises a housing 126, which houses the components described above. The lighting feature 104 is rotatably attached to the housing 126 via pivot points 107, thus allowing rotation of the lighting feature 104 about the first axis of rotation 106.

In the preferred embodiment, rotatable means 114 is biased against lighting feature 104 such angled surface 118 is in contact with at least one of contact surfaces 110A and 110B. In one example, the rotatable means 114 is held by the housing 126 such that the angled surface 118 of rotatable means 114 is continually in contact with at least one of, and more preferably both of, the contact surfaces 110A and 110B of lighting feature 104. Thus in the preferred embodiment, the angled surface 118 is a contact surface of the rotatable means 114 corresponding to the contact surfaces 110A, 110B of the lighting feature 104. Consequently, when rotatable means 114 is rotated around the second axis of rotation 116, the angled surface 118 of rotatable means 114 effects angular displacement of lighting feature 104, thus acting as a cam (e.g. a face cam), as explained below.

FIG. 2 shows cross sections of the lighting unit 102 of FIG. 1, wherein the lighting feature 104 is being adjusted to different positions. Certain features of the lighting unit 102 (as discussed above in relation to FIG. 1) are not shown in FIG. 2 in the interest of clarity.

Figure 2A:
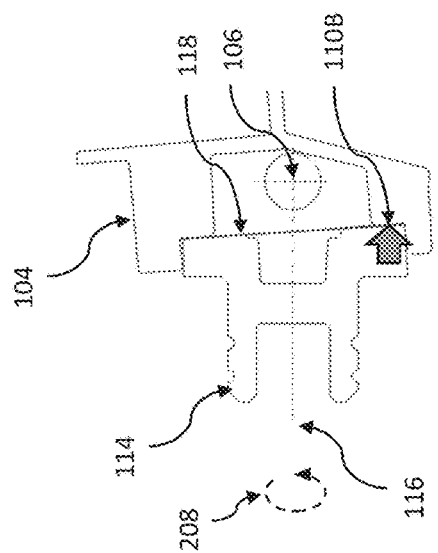
FIGS. 2A, 2B and 2C show a lighting feature being adjusted to different positions.

FIG. 2A shows lighting feature 104 at a first position. The rotational position of the rotatable means 114 (such as a cam) around the second axis of rotation 116 is such that the angled surface 118 of the rotatable means 114 pushes against the upper contact surface 110A and the lower contact surface 110B, so as to prevent the lighting feature 104 from rotating about the first axis 106 and thus moving from the first position. As shown in FIG. 2A, the rotational position of the rotatable means 114 is such that the rearward portion lies directly behind the forward portion from the direction of the viewer.

Figure 2B:
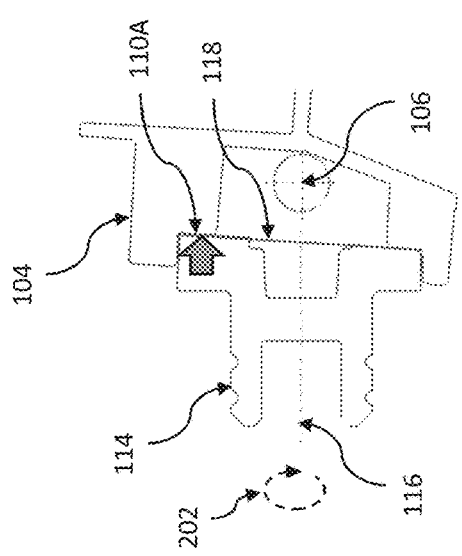

FIG. 2B shows a change in position of lighting feature 104 upon rotation of rotatable means 114. Starting from the configuration shown in FIG. 2A, rotatable means 114 has been rotated in a first direction 202 around the second axis of rotation 116. By doing so, the forward portion moves relative to the lighting feature 104 such that the forward portion pushes against the upper contact surface 110A of the lighting feature 104. Consequently, the lighting feature 104 rotates around the first axis of rotation 106 (in this case angling the lighting feature downwards).

As the rotatable means 114 is rotated further in the first direction 202, the rotatable means 114 will eventually reach a position in which the part of the angled surface 118 projecting furthest will contact the upper contact surface 110A. When this happens, the lighting feature 104 will be at its lowest angular position. Further rotation of the rotatable means 114 in the first direction 202 will result in the part of the angled surface 118 projecting furthest moving away from the upper contact surface 110A, and thus the angular position of the lighting feature 104 will increase.

Figure 2C:
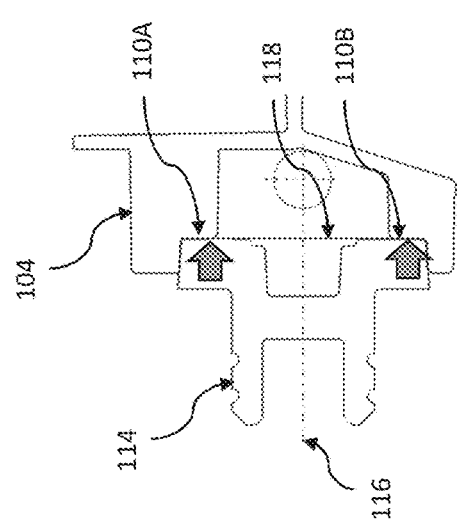

FIG. 2C shows a different change in position of lighting feature 104 upon rotation of rotatable means 114. Starting from the configuration shown in FIG. 2A, rotatable means 114 has been rotated in a second direction 208 around the second axis of rotation 116. By doing so, the forward portion moves relative to the lighting feature 104 such that the forward portion pushes against the lower contact surface 110B of the lighting feature 104. Consequently, the lighting feature 104 rotates around the first axis of rotation 106 (in this case angling the lighting feature downwards).

As the rotatable means 114 is rotated further in the second direction 208, the rotatable means 114 will eventually reach a position in which the part of the angled surface 118 projecting furthest will contact the lower contact surface 110B. When this happens, the lighting feature 104 will be at its highest angular position. Further rotation of the rotatable means 114 in the second direction 208 will result in the part of the angled surface 118 projecting furthest moving away from the lower contact surface 110B, and thus the angular position of the lighting feature 104 will decrease.

Accordingly, as the rotatable means 114 is rotated through 360 degrees in a particular direction (either first direction 202 or second direction 208), the angular position of the lighting feature 104 changes cyclically, including both increases and decreases in angular position, such that after one revolution of the rotatable means 114 through 360 degrees, the angular position of the lighting feature has returned to its starting angular position.

Beneficially, continuous rotational adjustment of rotatable means 114 around the second axis of rotation 116 results in continuous rotational adjustment of the lighting feature 102 around the first axis of rotation 106. Accordingly the invention is able to provide accurate and granular control of the angle of a lighting feature (e.g. reflector, light source, etc.). Moreover, the invention provides this accurate control using a mechanically simple components that are few in number and easy to assemble, in contrast to known, complex, gearing systems. This has the added benefit of simplifying manufacture of adjustable lighting units and reducing manufacturing costs. Additionally, the invention also reduces the amount of space required for the adjustment features is reduced as compared to traditional systems.

Returning to FIG. 1, rotatable means 114 optionally includes a distal cavity (e.g. socket) 120 located at a further distal end to the angled surface 118, configured to receive a driving means such as a hexagonal Allen key, a square Allen key, a cross screwdriver, a slot screwdriver, or other manual driving means. Accordingly, when a driving means such as a hexagonal Allen key is placed within the correspondingly shaped distal cavity 120 of rotatable means 114, the application of torque to the driving means enables rotational movement of the rotatable means 114 around the second axis of rotation 116, as indicated by the arrow 117. This provides a simple to use means for adjusting the angular displacement of the lighting feature 102. Preferably the distal cavity 120 is accessible through a gap in the housing 126, such that the rotatable means 114 can be rotated via driving means without having to disassemble the housing.

Alternatively, a powered means for rotating the rotatable means 114 can be provided, such as a stepper motor or similar, thereby allowing for adjustment of the angle of the lighting feature 104 remotely via electrical input to the powered means.

In the preferred embodiment lighting unit 102 further includes means for preventing undesired rotation of the rotatable means 114 and hence preventing undesired changes in angular position of the lighting feature 104.

In one example, the lighting feature 104 comprises an upper positional locking feature 112A and a lower positional locking feature 112B, located distal to front portion 105 and in proximity to upper contact surfaces 110A and 110B. In this embodiment, positional locking features 112A and 112B comprise laterally extending projections that extend beyond contact surfaces 110A and 110B. In the preferred embodiment, positional locking feature 112A is positioned above upper contact surface 110A with respect to the first axis of rotation 106, and positional locking feature 112B is positioned below lower contact surface 110B with respect to the first axis of rotation 106.

In this example, the positional locking features 112A, 112B interact with a circumferential locking feature 122 on the rotatable means 114 (optionally located on a distal portion 124 proximate to the angled surface 118). In the preferred embodiment, the circumferential locking feature 122 comprises a plurality of projections spaced along a portion of the outer face of the distal portion 124. In other embodiments, the circumferential locking feature 122 comprises a plurality of depressions space along a portion of the outer face of the distal portion 124. An example of the circumferential locking feature 122 is more clearly shown in FIG. 3 as will be discussed in more detail below.

The circumferential locking feature 122 of the rotatable means 114 is arranged to interact with the positional locking features 112A and 112B of the lighting feature 104. In the preferred embodiment, when the lighting feature is not being adjusted, the upper locking feature 112A is disposed between adjacent projections of the circumferential locking feature 122, and the lower locking feature 112B is disposed between adjacent projections of the circumferential locking feature 122 (different to those of the upper locking feature 112A). At least one of the projections of the circumferential locking feature 122 and the locking features 112A, 112B are resiliently deformable (for example fabricated from plastic or other material having at least some degree of flexibility). Accordingly, whilst the interaction of the circumferential locking feature 122 and the locking features 112A, 112B provides resistance against rotation of the rotatable means 114, this resistance can be overcome by a deliberate input to the rotatable means. For example, when sufficient torque to rotatable means 114 around the second axis of rotation 116, the locking features 112A and 112B of the lighting feature 104 are pushed over an adjacent projection and are disposed into one of the next adjacent spaces between projections of the circumferential locking feature 122.

Advantageously, this aspect provides a simple configuration that enables the rotational position of the rotatable means 114 to be maintained in the absence of a deliberate input, and thus keeping the angular displacement of the lighting feature 104 fixed. Furthermore, this configuration allows for precise angular adjustment of the lighting feature 104 by fixed increments, wherein the increments are dictated by the spatial frequency of the projections/depressions on the circumferential locking means 122. Accordingly, the fixed increments can be tailored to specific applications simply by providing a certain number of projections/depressions around the circumferential locking feature.

In alternative examples, the lighting unit 102 is provided with locking means that are known in the art, for example magnetic means, electromagnetic means, mechanical fastening means, and alternative frictional means.

Figure 3:
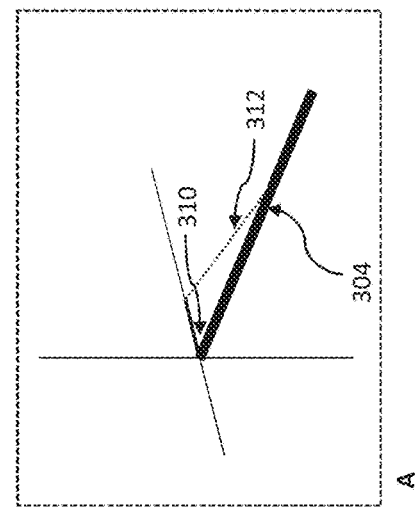
FIG. 3 shows an exemplary rotatable means.
Figure 3:
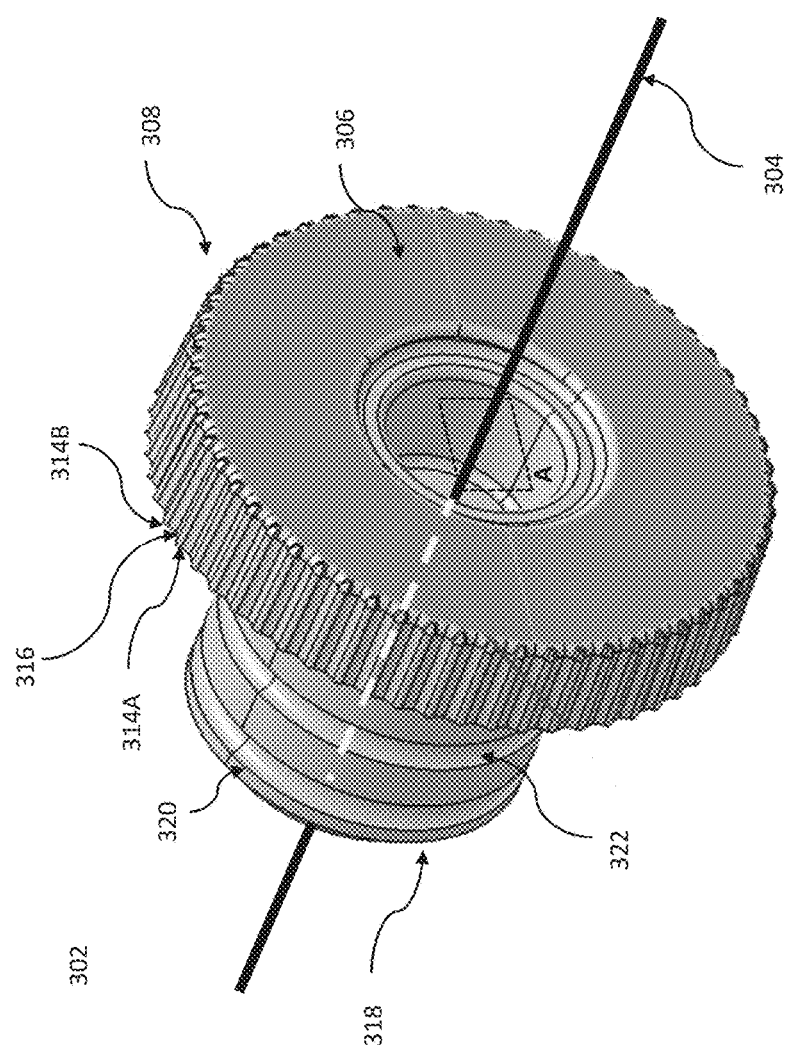

FIG. 3 shows an exemplary rotatable means 302 (for example a cam, more particularly a face cam). Rotatable means 302 is configured to rotate around a second axis of rotation 304 and has an angled surface 306 located on a distal portion 308. The angled surface 306 is angled with respect to the second axis of rotation 304. In the preferred embodiment, the angled surface 306 is planar and as such, there is an angle 310 between the direction 312 normal to the angled surface 306 and the direction along the second axis of rotation 304. In other embodiments, the angled surface 306 may be non-planar.

As discussed with reference to FIG. 1, the angled surface 306 of rotatable means 302 effects angular displacement of a lighting feature 102 around a first axis of rotation 106. Thus the extent of the rotational adjustment of a lighting feature may be determined by the angle 310 of angled surface 306 with respect to the second axis of rotation 304. Therefore, a benefit of the claimed invention is that for a given lighting unit 102, it is possible to change the range of angular displacement provided by the described system simply by swapping the rotatable means 114, 302 for a different one with an angular surface having a different angle. This can reduce manufacturing costs as no changes would be required to the lighting feature or housing element, since it is easy to retrofit a different rotatable means 302, 114.

The rotatable means 302 includes a plurality of projections spaced along the outer circumference of distal portion 308. Adjacent projections, e.g. 314A and 314B, define a groove 316. This shaping allows for positional locking features such as 112A and 112B of lighting feature 102 to sit in a groove 316 between adjacent projections 314A, 314B when no adjustment is being performed, and to transition from one groove to an adjacent groove when sufficient torque is applied to rotatable means 302 around the second axis of rotation 304.

Alternatively, the outer circumference of distal portion 308 includes a plurality of spaced depressions. Positional locking features such as 112A and 112B of lighting feature 102 are then positioned within corresponding depressions in the distal portion 308 of rotatable means 302.

Optionally, the distal portion 308 of rotatable means 302 has a circumference greater than the remaining portion of rotatable means 302 (as shown in FIG. 3). Alternatively, distal portion 308 may have a circumference substantially the same as the remaining portion of rotatable means 302. Further, distal portion 308 may have a circumference lesser than the remaining portion of the rotatable means 302.

The exemplary rotatable means 302 further includes a rear distal portion 318 located at a further distal end to distal portion 308. The rear distal portion 318 includes a rear latching feature 320. As described in more detail below in relation to FIG. 4, the rear latching feature 320 is configured to interact with a corresponding latching feature of a housing element. When rear latching feature 320 engages with a corresponding latching feature of a housing element, the rotatable means 302 is able to rotate around the second axis of rotation 304 but is prevented from moving laterally in the direction of the axis of rotation 304.

In the preferred embodiment, the rear latching feature 320 of rotatable means 302 is an element of a push latch mechanism; however, the skilled person will appreciate that other latching means may be used such as electromagnetic latch, clip latches, or cam latch.

Rotatable means 302 also includes a circumferential groove 322 located on a portion proximal to distal portion 308 and distal portion 318. In the preferred embodiment, the circumferential groove 322 is a depression extending around the circumference of rotatable means 302 with the width of the depression being substantially the same at all points around the circumference. As described in further detail below in relation to FIG. 4, the circumferential groove is dimensioned to receive a joining means (for example an O-ring or gasket) at the interface of the rotatable means 302 and corresponding housing element when used in an embodiment such as that of FIG. 4.

Figure 4:
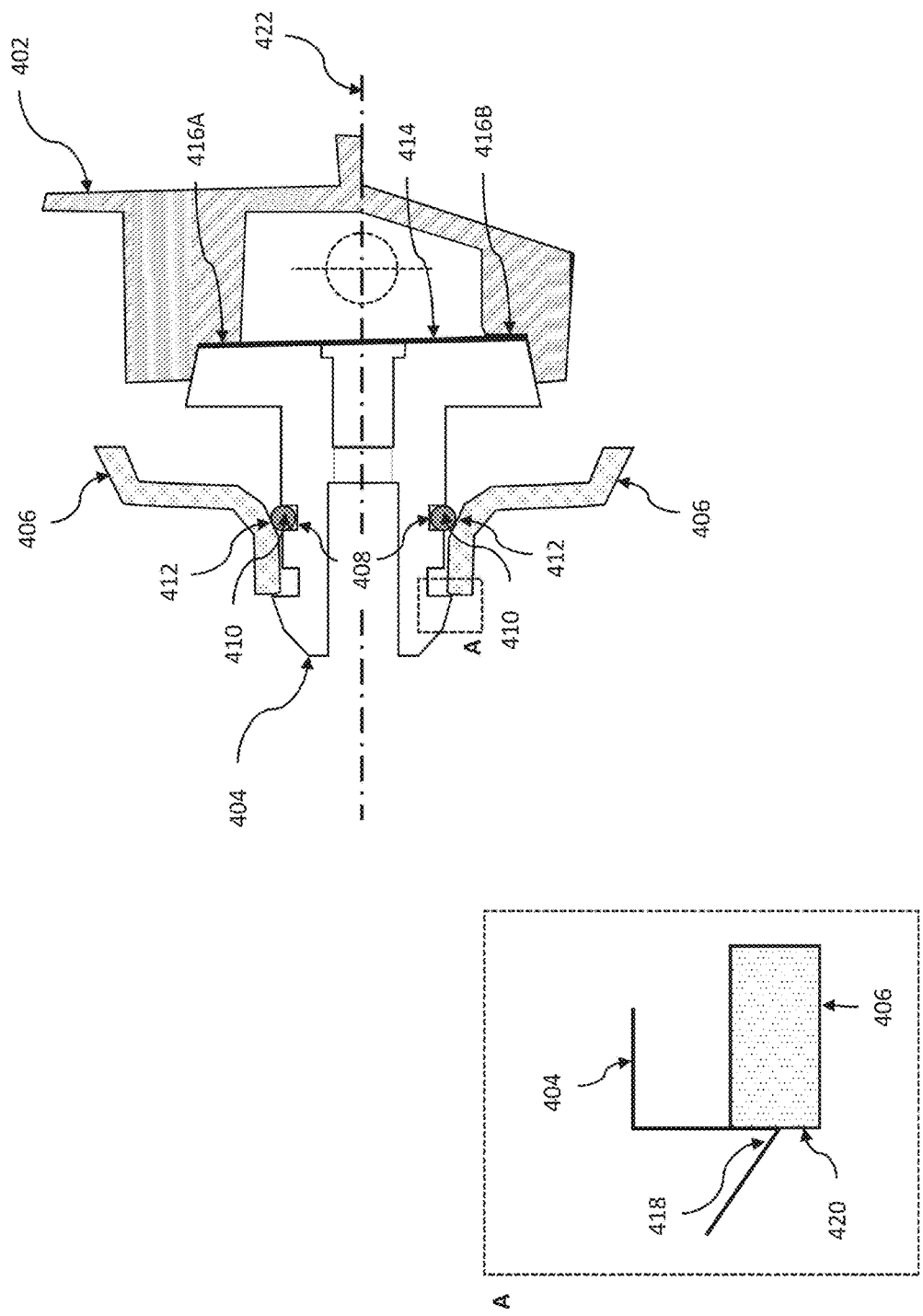
FIG. 4 shows a schematic of a portion of a cross section of an adjustable lighting unit.

FIG. 4 shows a schematic of a portion of a cross section of an exemplary adjustable lighting unit such as the lighting unit 102 shown in FIG. 1.

FIG. 4 shows a lighting feature to be adjusted 402, a rotatable means 404 configured to adjust lighting feature 402, and a portion of a housing element 406. Rotatable means 404 has a circumferential groove 408 which holds a joining means 410. Joining means 410 is dimensioned to be seated substantially within the circumferential groove 408. In the preferred embodiment, the joining means 408 is an O-ring. Housing element 406 has a joining surface 412. In the preferred embodiment, joining surface 412 comprises a portion of the inner surface of housing element 406.

The joining means 410, such as an O-ring, is configured to be compressed against joining surface 412 of housing element 406 when rotatable means 404 is place in position within housing element 406. As such, joining means 410 biases the rotatable means 404 against the housing element 406 such that the rotatable means 404 is kept in contact with the lighting feature 402. Optionally the joining means 410 also forms a seal at the interface of joining surface 412 of housing element 406 and circumferential groove 408 of rotatable means 404, beneficially acting to reduce ingress of moisture/dust/etc. into the lighting unit.

Advantageously this arrangement provides an effective and easily fabricated means to keep the rotatable means 404 under tension and thus maintain contact between the angled surface 414 of rotatable means 404 and contact surfaces 416A and 416B of lighting feature 402 is maintained.

Rotatable means 404 shown in FIG. 4 further includes a rear latching feature 418. As described above with reference to FIG. 3, rear latching feature 418 is located on an end of rotatable means 404 that is distal to the angled face 414. Rear latching feature 418 of rotatable means 404 is configured to interact with the rear latching feature 420 of housing element 406. In the preferred embodiment, rear latching feature 418 of rotatable means 404 and rear latching feature 420 of housing element 406 form a push-click latch. Accordingly, the circumference of the portion of rotatable means 404 upon which the rear latching feature 418 is located slightly exceeds the circumference of the cavity of housing element 406, the circumference of which comprises the rear latching feature 420 of housing element 406. In the preferred embodiment, rear latching feature 418 of rotatable means 404 and rear latching feature 420 of housing element 406 are configured to form an interference fit.

Accordingly, the combination of joining surfaces 412 and the rear latching feature 418 of the housing element 406 define a socket for receiving the rotatable means 404.

Rear latching features 418 of rotatable means 404 and 420 of housing element 406, along with the join formed using joining means 410, enable the rotatable means 404 to rotate around axis of rotation 422 but substantially prevent travel of the rotatable means 404 in a direction along the axis of rotation 422. A further advantage of rear latching features 418 of rotatable means 404 and 420 of housing element 406, along with the join formed using joining means 410, is that contact is maintained between the angled face 414 of rotatable means 404 and contact surfaces 416A and 416B of lighting feature 402.

FIGS. 5-9 show a specific example of the preferred embodiment.

Figure 5:
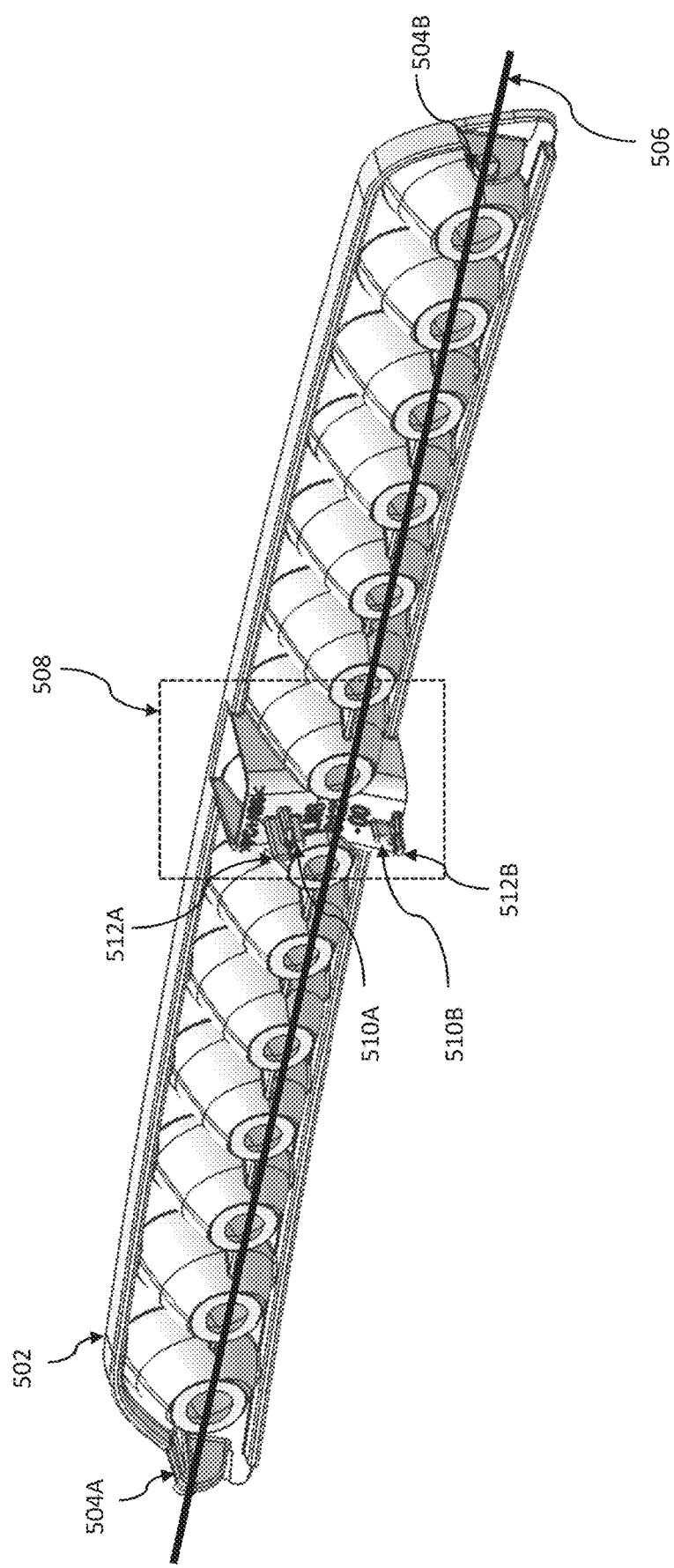
FIG. 5 shows a specific example of a lighting feature according to the preferred embodiment.

FIG. 5 shows a specific example of a lighting feature 502 according to the preferred embodiment.

Lighting feature 502 is a reflector for use within a vehicular lighting system. Specifically, in the case of FIG. 5, the reflector 502 is for use as an auxiliary roof bar light, for example a "take-down light". Lighting feature 502 is configured to receive one or more optical elements such as Light Emitting Diodes (LED), halogen lamps, or fluorescent elements.

The reflector 502 of FIG. 5 has two pivot features 504A and 504B located at distal ends of lighting feature 502. Pivot features 504A and 504B are substantially cylindrical projections that define pivot points of the first axis of rotation 506 of reflector 502. Pivot feature 504A and 504B of reflector 502 are dimensioned to rest within corresponding pivot receivers of another element, such as a housing element.

Reflector 502 further includes a portion 508 that is substantially central on lighting feature 502. Portion 508 includes upper and lower contact surfaces 510A and 510B, and upper and lower positional locking features 512A and 512B. Contact surfaces 510A and 510B, and positional locking features 512A and 512B are located on an interior side of reflector 502.

Figure 6:
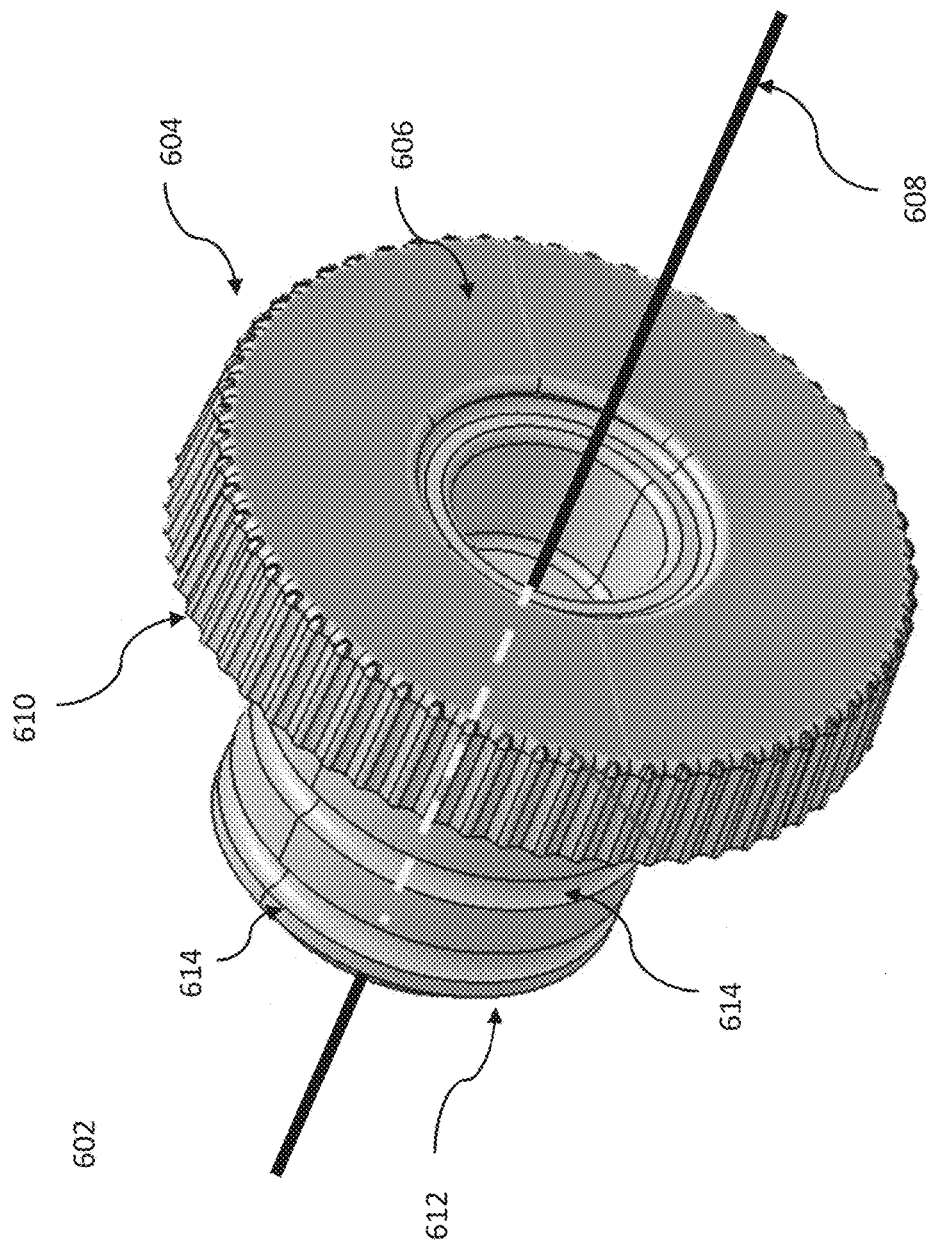
FIG. 6 shows a specific example of a rotatable means.

FIG. 6 shows a specific example of a rotatable means 602 configured to interact with the reflector 502 of FIG. 5.

Rotatable means 602 is a cam. Optionally, cam 602 may be formed of a single moulded piece of plastic. The skilled person would appreciate that cam 602 may be manufactured using any appropriate material, for example metals or plastics, using any suitable manufacturing method known in the art.

Cam 602 has a front portion 604 containing a face 606. The front portion 604 has a circumference substantially larger than the remaining portion of cam 602. Face 606 is at a distal end of the cam 602 and is a planar surface that is angled with respect to the axis of rotation 608 of the cam 602 such that the face 606 is not perpendicular to the axis of rotation 608. Preferably the face lies at an angle of between 1 and 10 degrees with respect to the axis of rotation 608. More preferably the angle is between 1 and 5 degrees. In one example, the angle is 3 degrees—in this example, the angle of the reflector 502 can be changed between +3 degrees and −3 degrees about a neutral position. The front portion 604 of cam 602 has a plurality of teeth 610 spaced along the outer circumference of portion 604. The plurality of teeth 610 form a tooth and groove configuration where a groove is defined by the space between two adjacent teeth. As described in more detail above, the grooves formed between adjacent teeth of the plurality of teeth 610 are used to hold the positional locking features 512A and 512B of reflector 502.

Figure 8:
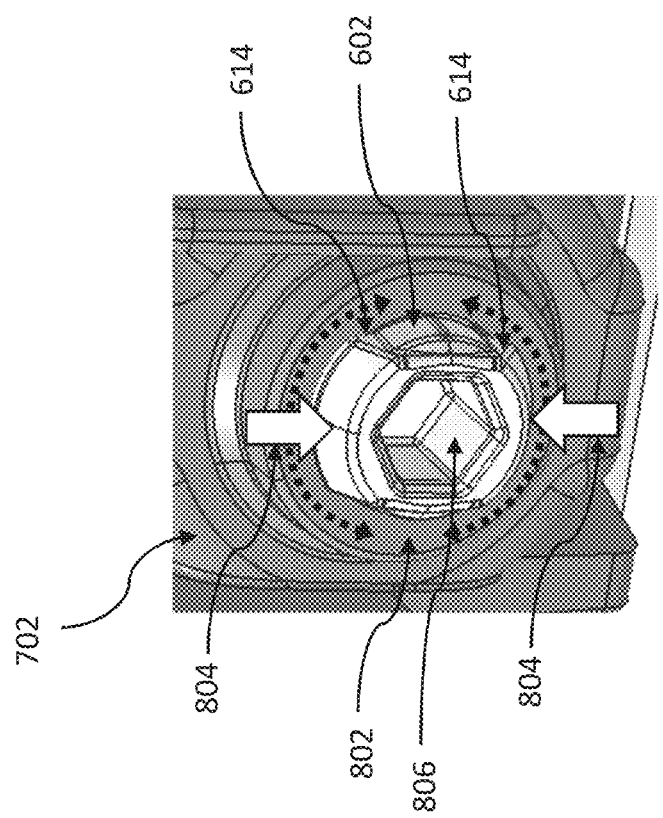
FIG. 8 shows a specific example of a rear portion of housing element.

Cam 602 has a rear portion 612 forming a rear latching feature 614. The rear portion 612 has a circumference substantially larger than the adjacent central portion of cam 602 but lesser than the front portion 604—as shown in FIG. 8 (discussed below) the larger circumference of the rear portion takes the form of two extending tabs in this specific example.

Cam 602 also has a circumferential groove 616 located in between to the front portion 604 and rear portion 612 of the cam 602. The circumferential groove 616 is dimensioned to receive an O-ring, such that the O-ring biases the cam 602 against a surface of the housing element within which the cam is placed.

Figure 7:
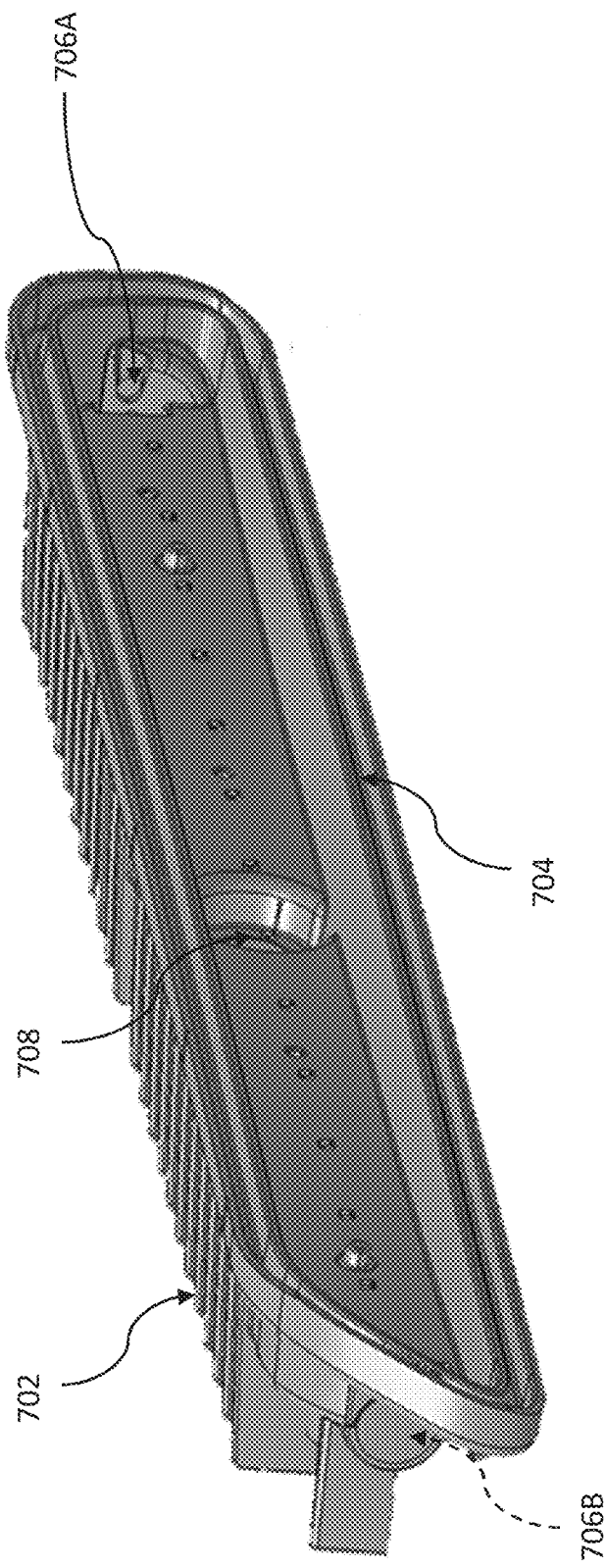
FIG. 7 shows a specific example of a housing element.

FIG. 7 shows a specific example of a housing element 702 configured to house the reflector 502 of FIG. 6 and the cam 602 of FIG. 6.

Housing element 702 has an open face 704 at the front portion and is dimensioned such that the reflector 502 fits within the cavity formed by open face 704. Housing element 702 also includes two interior pivot receivers 706A and 706B located on interior distal ends of housing element 702. Interior pivot receivers 706A and 706B are shaped and positioned to receive pivot features 504A and 504B of reflector 502 such that when pivot features 504A and 504B are seated within pivot receivers 706A and 706B they define pivot points of the first axis of rotation 506 of reflector 502. Accordingly, pivot receivers 706A and 706B allow rotation by not translation of the reflector 502.

The housing element 702 further includes a socket 708 substantially proximal to pivot receivers 706A and 706B. Socket 708 extends from an opening within the cavity formed by open face 704 on the front portion of housing element 702, to an opening upon the rear portion of housing element 702. Socket 708 has a size and shape configured to receive the cam 602, such as the socket described above in relation to FIG. 4.

FIG. 8 shows a perspective view of a rear portion of the housing element 702 described above in relation to FIG. 8, when the cam 602 is engaged in the housing 702.

FIG. 8 shows a cam 602 placed within housing element 702 such that the rear latching feature 614 (shown here comprising two extended tabs) of the rear portion 612 of cam 602 protrudes from the rear cavity of housing element 702. As such, the rear latching feature 614 has dimensions larger than the socket of housing element 702. Therefore, the rear latching feature 614 forms an interference fit with a rear latching feature 802 of housing element 702 (as described above in relation to FIG. 4). When the cam 602 and housing element 702 are in the latched configuration as shown in FIG. 8, the cam 602 is able to rotate around the axis of rotation 608 but has constrained movement along the axis of rotation.

Optionally, at least a portion of the rear latching feature is resiliently deformable, such that when sufficient force 804 is applied to the rear latching feature 614 of cam 602, the dimensions of rear latching feature 614 can be reduced such that they no longer exceed the dimensions of the socket of housing element 402 thus allowing the cam 602 to be removed from the housing element 702 via the socket 708.

Rotation of the cam is achieved by placing a driver within the rear cavity 806 of cam 602. The rear cavity 806 of cam 602 is shaped hexagonally so as to receive a corresponding hexagonal driver. When a suitable driver is placed within rear cavity 806 of cam 602, rotation of the driver effects rotation of the cam around the axis of rotation 608. Preferably, the rotation may be driven manually by a driver such as an Allen key. Alternatively, powered means may be provided to drive the rotation of cam 602 using the rear cavity 806.

Figure 9:
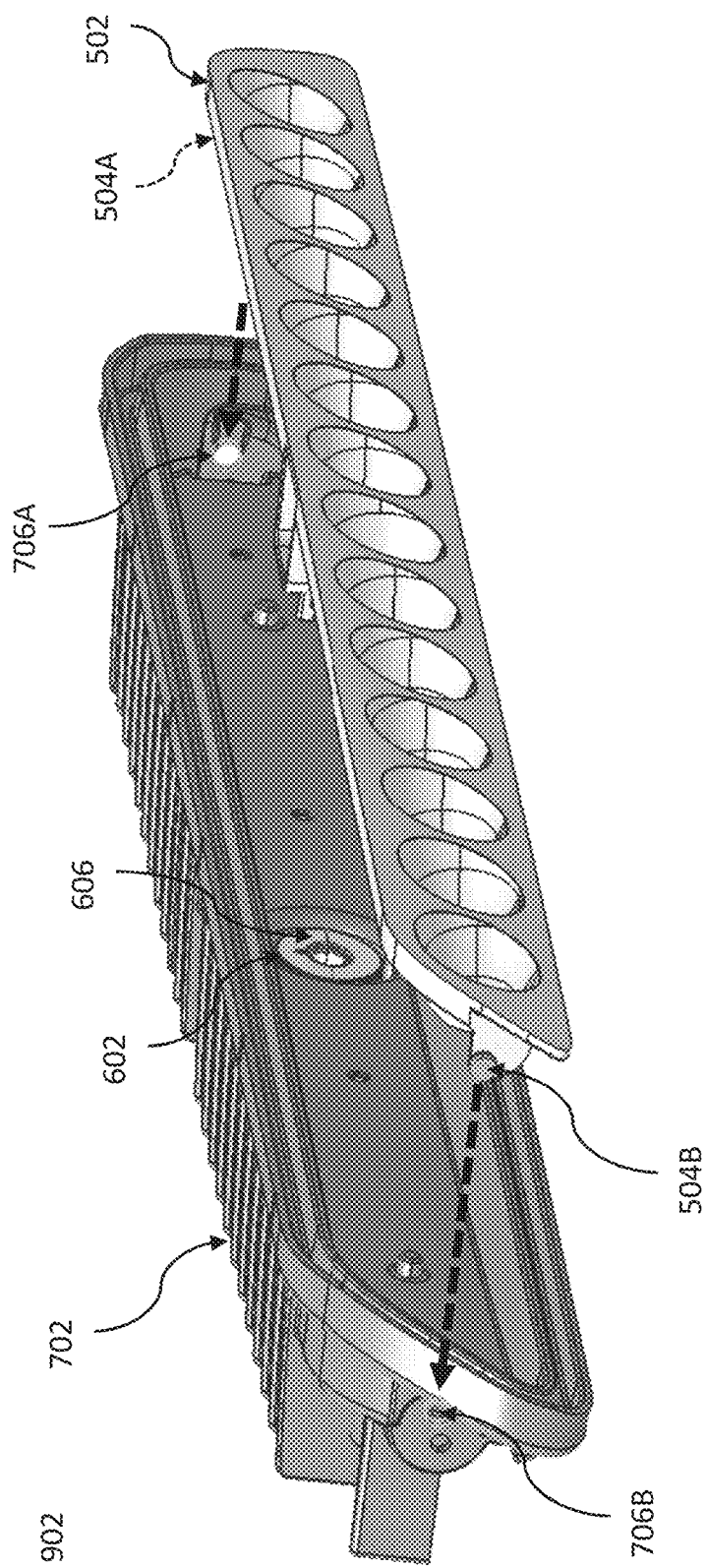
FIG. 9 shows a specific example of a lighting unit.

FIG. 9 shows a perspective view of a lighting unit 902 comprising the reflector 502, the cam 602 and the housing 702 described above.

The lighting unit 902 consists of the reflector 502, the housing element 702, and the cam 602. The reflector 502 is placed within housing element 702 such that the rear portion of 502 is placed within the cavity formed by the open front face of housing element 702. The pivot features 504A and 504B of reflector 502 engage with the pivot receivers 706A and 706B so that the reflector 502 rotates around the axis of rotation 506.

Cam 602 is placed within socket 708 of housing element 702 and rear latching feature 614 of cam 602 engages with rear latching feature 802 of housing element 702. The reflector 502 is positioned within housing element 702 such that the centre portion 508 of reflector 502, which includes the contact surfaces 510A, 510B and positional locking features 512A, 512B, is aligned with the cam 602. Angled surface 606 of cam 602 abuts the contact surfaces 510A and 510B of reflector 502. Upper and lower positional locking features 512A and 512B engage with the plurality of teeth 610 disposed along the outer circumference of the front portion 604 of cam 602. Upper and lower positional locking features 512A and 512B sit within grooves formed between adjacent teeth of the plurality of teeth 610.

Accordingly, the angular displacement of the reflector 502 around axis of rotation 506 can be affected by rotational adjustment of the cam 602.

Figure 10:
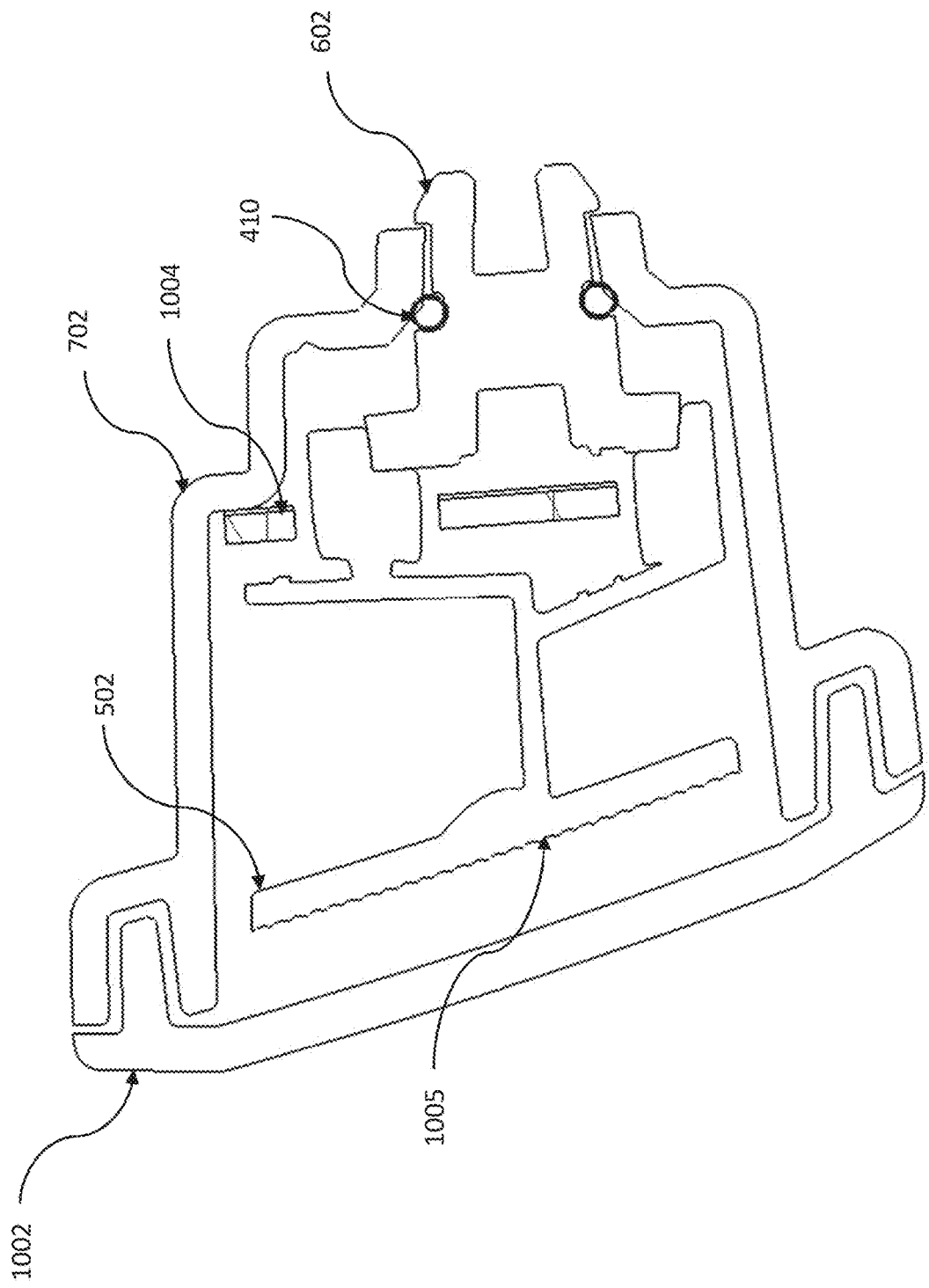
FIG. 10 shows a schematic cross sectional view of the lighting unit of FIG. 9.
Figure 11:
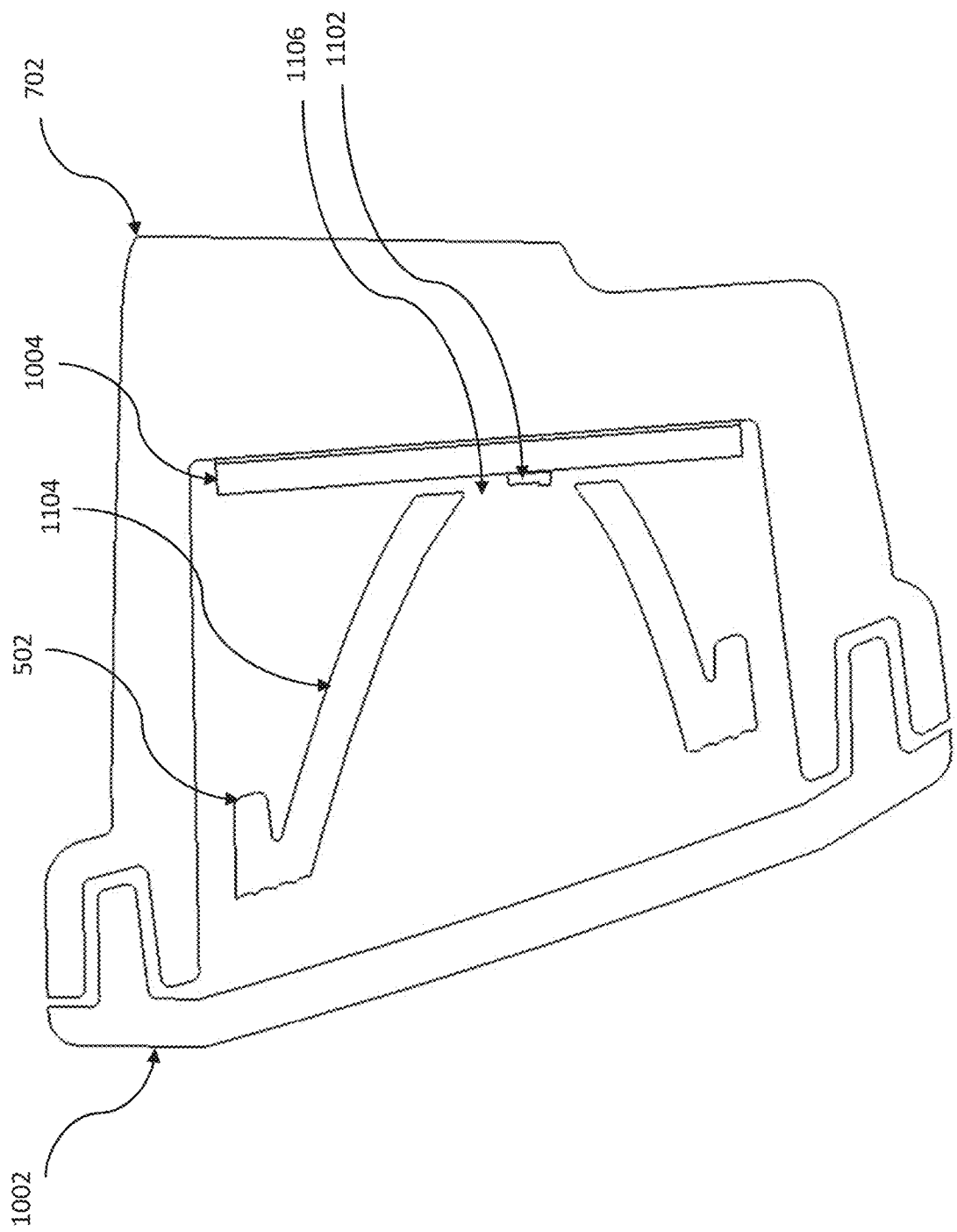
FIG. 11 shows a further schematic cross sectional view of the lighting unit of FIG. 9.

FIGS. 10 and 11 show schematic cross sectional views of the lighting unit 902 in planes parallel to the axis of rotation of the cam 608, at different positions along the length of the axis of rotation of the reflector 506.

FIG. 10 shows a schematic cross section of the lighting unit 902 in a plane passing though the cam 602. The lighting unit 902 further comprises an outer lens 1002, and a printed circuit board (PCB) 1004. The PCB 1004 preferably comprises circuitry for driving a light source such as an LED. The reflector 502 optionally comprises a textured portion 1005.

FIG. 11 shows a schematic cross section of the lighting unit 902 in a plane passing through a point along the axis of rotation of the reflector 506 remote from the cam 602. The PCB 1004 comprises an LED 1102. The reflector 502 preferably comprises a substantially parabolic profile portion 1104 and an aperture 1106. In other embodiments, the reflector 502 comprises a portion that is not parabolic in profile. The LED 1102 is positioned such that light emitted by the LED 1102 passes through the aperture 1106 and is reflected by at least a part of the substantially parabolic profiled portion 1104, so as to be directed out of the lighting unit 902 via the outer lens 1002. Though a single LED 1102 is shown in FIG. 11, it will be appreciated that the lighting unit 902 may contain any number of LEDs. The number and types of LEDs provided depends on the end use of the lighting unit. Though one or more LEDs are the preferred form of light source for use in the lighting unit 902, it will be appreciated that other forms of light source (for example incandescent or fluorescent bulbs) could be used instead of/in addition to the one or more LEDs.

The above embodiments are provided as examples only. Further aspects of the invention will be understood from the appended claims.

What is claimed is:

1. A vehicular adjustable lighting unit, comprising:
a lighting feature, configured to rotate around a first axis of rotation, and comprising a first contact surface; and
a face cam, configured to rotate around a second different axis of rotation, and comprising a second contact surface, wherein the second contact surface is at an oblique angle with respect to the second axis of rotation; wherein:
the lighting unit is configured such that the first contact surface contacts the second contact surface and rotation of the face cam around the second axis of rotation causes the second contact surface to displace the first contact surface thereby adjusting the angular displacement of the lighting feature around the first axis of rotation;
the lighting feature comprises a locking feature configured to abut the face cam in order to resist changes to the rotational position of the face cam and the lighting feature; and
the face cam comprises one or more corresponding elements configured to interact with the locking feature so as to resist changes to the rotational position of the face cam, wherein the corresponding elements are disposed along a circumference of the face cam.

2. The vehicular lighting unit of claim 1, wherein the corresponding elements comprise one or more of: one or more projections; one or more grooves; and one or more depressions.

3. The vehicular lighting unit of claim 1, wherein the locking feature is configured to be interposed between a first one of a plurality of projections of the face cam and a second one of the plurality of projections of the face cam so as to resist changes to the rotational position of the face cam and the lighting feature.

4. The vehicular lighting unit of claim 1, wherein the locking feature is configured to be positioned within one of a plurality of depressions of the face cam so as to resist changes to rotational position of the face cam and the lighting feature.

5. The vehicular lighting unit of claim 1, wherein the first axis of rotation is substantially orthogonal to the second axis of rotation.

6. The vehicular lighting unit of claim 1, wherein the contact surface is a distal end of the face cam.

7. The vehicular lighting unit of claim 1, wherein the face cam comprises a drive receiving means, wherein rotation of the rotational means around the second axis of rotation is effected via the drive receiving means.

8. The vehicular lighting unit of claim 7, wherein the drive receiving means is a cavity configured to receive a hex key or a screwdriver.

9. The vehicular lighting unit of claim 7, wherein the drive receiving means is configured to interact with a powered driving means.

10. The vehicular lighting unit of claim 1, further comprising a housing element configured to house the face cam and the lighting feature.

11. The vehicular lighting unit of claim 10, wherein the housing element comprises a socket configured to receive the face cam.

12. The vehicular lighting unit of claim 11, wherein the face cam comprises a latching feature configured to interact with the socket of the housing element such that the translational position of the face cam relative to the housing element is maintained.

13. The vehicular lighting unit of claim 11, wherein the socket comprises a joining surface and the face cam comprises a joining means, wherein the joining means and the joining surface interact so as to bias a portion of the face cam against the housing when the face cam is in the socket.

14. The vehicular lighting unit claim 13, wherein the face cam comprises a circumferential groove, and the joining means is positioned within the circumferential groove.

15. The vehicular lighting unit of claim 13, wherein the joining means is one or more of an O-ring and a gasket.

16. The vehicular lighting unit of claim 10, wherein the housing element comprises a pivot receiver.

17. The vehicular lighting unit of claim 16, wherein:
the lighting feature comprises a pivot feature; and
pivot receiver is configured to rotatably hold the pivot feature such that the first axis of rotation about which the lighting unit rotates runs through the pivot feature.

18. The vehicular lighting unit of claim 1, wherein the lighting feature is a reflector.

19. The vehicular lighting unit of claim 1, wherein the lighting unit is configured to be mounted on a vehicle.

20. The vehicular lighting unit of claim 19, wherein the lighting unit is a car head lamp.

21. The vehicular lighting unit of claim 19, wherein the lighting unit is an auxiliary roof light bar.

22. The vehicular lighting unit of claim 21, wherein the lighting unit is a takedown light.

23. A vehicle comprising the vehicular lighting unit of claim 1.

24. The vehicular lighting unit of claim 1, wherein the first contact surface is a planar contact surface, and the second contact surface is a planar contact surface, and a portion of the first contact surface and a portion of the second contact surface abuts against each other.

25. The vehicular lighting unit of claim 1, wherein the face cam includes an outer circumferential portion having a plurality of teeth positioned about the outer circumferential portion.

26. The vehicular lighting unit of claim 1, wherein the face cam comprises a forward portion and a rearward portion of the second contact surface, the forward portion projecting further in the direction of the second axis while abutting the first contact surface than a rearward portion of the second contact surface while abutting the first contact surface.

* * * * *